(12) United States Patent  
Liao et al.

(10) Patent No.: US 6,377,449 B1
(45) Date of Patent: Apr. 23, 2002

(54) DRIVE BRACKET FOR COMPUTER DATA STORAGE DEVICE

(75) Inventors: Nien Chiang Liao, Lu-Chou; Chiu-Chen Lin, Lin-Ko, both of (TW)

(73) Assignee: Hon Hai Aprecision Ind. Co., Ltd., Taipei Hsien (TW)

( * ) Notice: Subject to any disclaimer, the term of this patent is extended or adjusted under 35 U.S.C. 154(b) by 79 days.

(21) Appl. No.: 09/605,130

(22) Filed: Jun. 27, 2000

(51) Int. Cl.[7] ................................................. H05K 5/00
(52) U.S. Cl. .............................. 361/685; 361/683–685; 361/724-727; 312/223.1; 312/223.2; 439/928.1; 248/65; 248/73
(58) Field of Search ................................ 361/683–686, 361/724–727; 312/222, 223.1, 223.2, 349, 350; 248/65, 73, 535, 534; 439/53, 152, 157, 928.1

(56) References Cited

U.S. PATENT DOCUMENTS

| 5,211,459 | A | * | 5/1993 | Wu ........................... 312/223.2 |
| 5,481,431 | A | * | 1/1996 | Siahpolo et al. ............ 361/685 |
| 5,485,348 | A | * | 1/1996 | Oros ........................... 361/685 |
| 5,513,068 | A | * | 4/1996 | Girard ......................... 361/685 |
| 5,584,396 | A | * | 12/1996 | Schmitt ........................ 211/26 |
| 5,587,879 | A | * | 12/1996 | Spano et al. ................. 361/785 |
| 5,668,696 | A | * | 9/1997 | Schmitt ....................... 361/685 |
| 5,768,099 | A | * | 6/1998 | Radlof et al. ............... 361/685 |
| 5,947,572 | A | * | 9/1999 | Chang ..................... 312/332.1 |
| 6,256,195 | B1 | * | 7/2001 | Liao ............................ 361/785 |
| 6,275,382 | B1 | * | 8/2001 | Siedow et al. .............. 361/727 |
| 6,305,648 | B1 | * | 10/2001 | Liu et al. ................... 248/27.1 |
| 6,305,660 | B1 | * | 10/2001 | Liao ............................ 248/694 |

* cited by examiner

*Primary Examiner*—Leo P. Picard
*Assistant Examiner*—David Foster
(74) *Attorney, Agent, or Firm*—Wei Te Chung

(57) ABSTRACT

A drive bracket (8) for a data storage device includes a body (10) and a lever (50). The body includes a bottom panel (12) and two side walls (14, 16) extending from opposite side edges of the bottom panel. The body has a pair of sliding slots (18) for receiving bolts (70) attached to a data storage device. The lever has a base (51) and two side plates (53) extending from opposite ends of the base. The two side plates are pivotally attached to the side walls of the body for being movable toward a closed position where the side plates engage the bolts and thus retain the data storage device in the body.

20 Claims, 7 Drawing Sheets

US 6,377,449 B1

DRIVE BRACKET FOR COMPUTER DATA STORAGE DEVICE

BACKGROUND

1. Field of the Invention

The present invention relates to a drive bracket for a data storage device, and particularly to a readily assembled, modularized drive bracket which is attached within a computer enclosure.

2. Description of Prior Art

Generally, when a computer is assembled, a drive bracket is mounted in a computer enclosure, and then data storage devices, such as a hard disk drive (HDD), a floppy disk drive (FDD) and a compact disk-read only memory (CD-ROM) drive are fixed to the drive bracket. This requires a long assembly line, which lowers assembly efficiency. Furthermore, an unworkable work site will lead to paralysis of the whole assembly line.

A conventional data storage device is generally attached to a drive bracket by bolts or rails. Fixing a data storage device to a drive bracket with bolts is complicated and time-consuming. Furthermore, the computer enclosure needs extra operating space for assembling the data storage device to the drive bracket using bolts. Fixing a data storage device in a drive bracket using rails is more convenient, but bolts are still needed to fix the rails to the drive bracket. Moreover, mounting systems using rails require a clearance between the data storage device and the drive bracket, which may cause electromagnetic interference (EMI) problems and may lead to accumulation of static charges on the computer enclosure. Additionally, the rails are generally made of plastic, which results in a grounding connection problem between the data storage device and the drive bracket, and which requires extra maintenance to replace the plastic rails since they are easily worn out.

Examples of the conventional devices are disclosed in Taiwan Patent Application Nos. 78201813, 79209891, 80212301, 83208448, and U.S. Pat. No. 5,510,955.

SUMMARY OF THE INVENTION

Accordingly, an object of the present invention is to provide a drive bracket which is modularized with a data storage device to be readily attached to a computer enclosure.

Another object of the present invention is to provide a drive bracket which facilitates assembly and disassembly with a data storage device.

A further object of the present invention is to provide a drive bracket which provides effective grounding to inserted data storage devices for reducing EMI.

To achieve the above-mentioned objects, a drive bracket in accordance with the present invention comprises a body and a lever. The body comprises a bottom panel and two side walls extending from opposite side edges of the bottom panel for receiving a data storage device therein. The body has a pair of sliding slots for receiving a pair of bolts attached to the data storage device. The lever comprises a base and two side plates extending from opposite ends of the base. The two side plates are pivotally attached to the side walls of the body for being movable toward a closed position to engage with the bolts of the data storage device thereby retaining the data storage device in the body.

Other objects, advantages and novel features of the present invention will be drawn from the following detailed embodiments of the present invention with attached drawings, in which:

DESCRIPTION OF THE PREFERRED EMBODIMENTS

Figure 1:
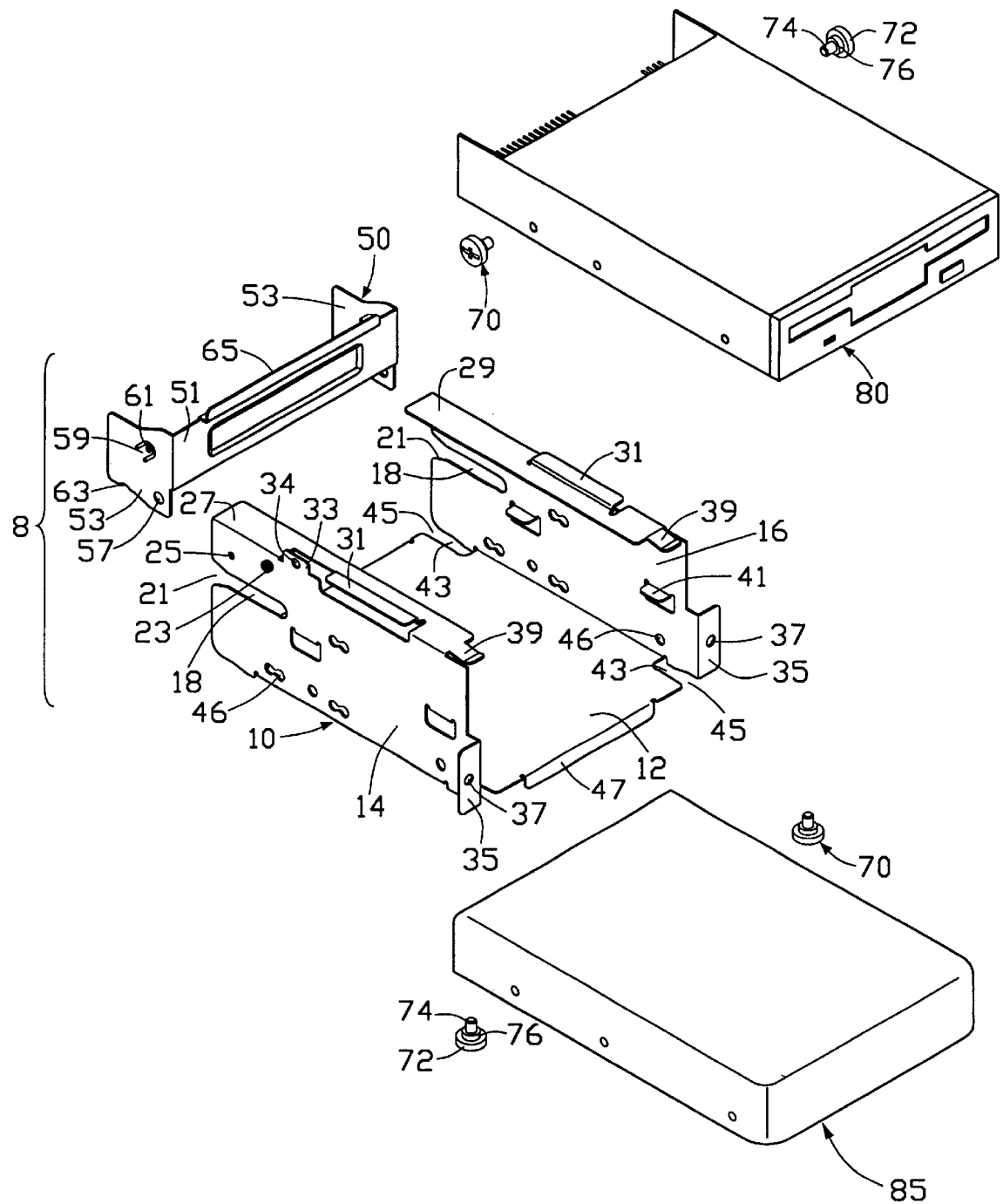
FIG. 1 is an exploded view of a drive bracket of the present invention with an HDD and an FDD attached thereto.
Figure 3:
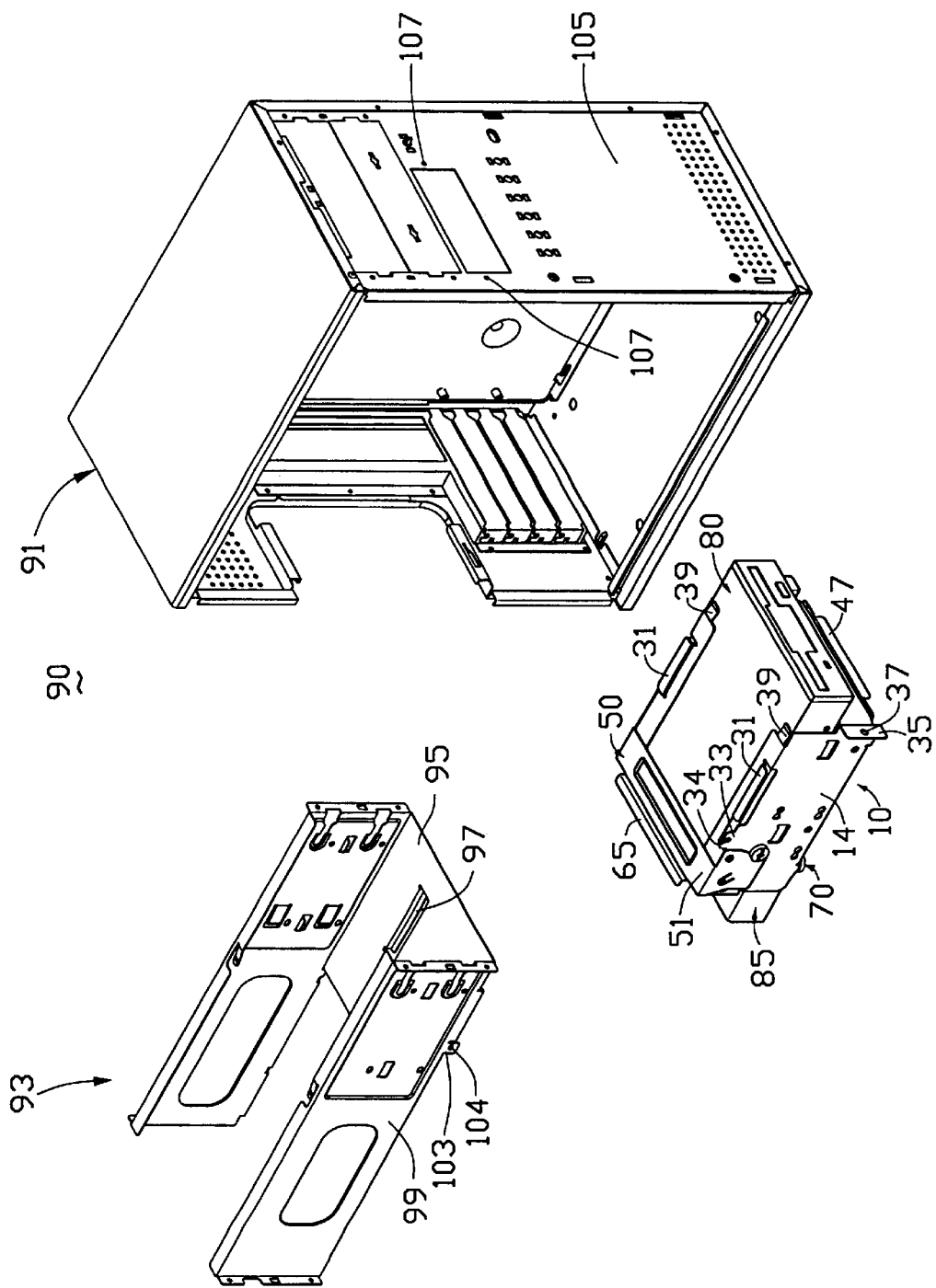
FIG. 3 is an unassembled view of a computer enclosure and a drive bracket in accordance with the present invention, with disk drives fixed therein.

As shown in FIGS. 1 and 3, a drive bracket 8 of the present invention secures a floppy disk drive (FDD) 80 and a hard disk drive (HDD) 85 in a computer enclosure 90. The drive bracket 8 comprises a body 10 and a lever 50 pivotally attached to the body 10.

Referring to FIG. 1, the body 10 includes a bottom panel 12 and first and second side walls 14, 16 extending from opposite edges of the bottom panel 12, forming a U-shaped configuration. The HDD 85 is supported on the bottom panel 12 while the FDD 80 is supported above the HDD 85 by aligned support tabs 41 formed on the side walls 14, 16. Sliding slots 18 are defined in the side walls 14, 16 for receiving bolts 70 attached to opposite sides of the FDD 80. Preferably, the bolts 70 comprise a head 72 from which a post 74 extends. An expanded portion 76 is formed on the post 74 adjacent the head 72. The post 74 has a threaded section (not labeled) engaging with an inner-threaded hole (not labeled) defined in a corresponding side face of the FDD 80 with the head 72 spaced from the FDD 80 by the expanded portion 76. The FDD 80 is received in the drive bracket 8 by being supported on the support tabs 41 with the expanded portions 76 of the bolts 70 guidingly received in the sliding slots 18. Preferably, the sliding slots 18 form wide openings 21 for facilitating insertion of the bolts 70 into the sliding slots 18.

The bottom panel 12 forms two pairs of slots 43 in front and rear sides thereof. Two bolts 70 are attached to a bottom face of the HDD 85 by threadingly engaging inner-threaded holes (not shown) defined in the HDD 85. The bolts 70 are selectively received in the front side slots 43 or the rear side slots 43 of the bottom panel 12 for retaining the HDD 85 in the body 10. Preferably, each slot 43 has a wide opening 45 for facilitating receiving the bolt 70 in the slot 43. Through holes 46 are defined in side walls 14, 16 for selectively receiving bolts (not shown) to secure the HDD 85 in the body 10.

Figure 2:
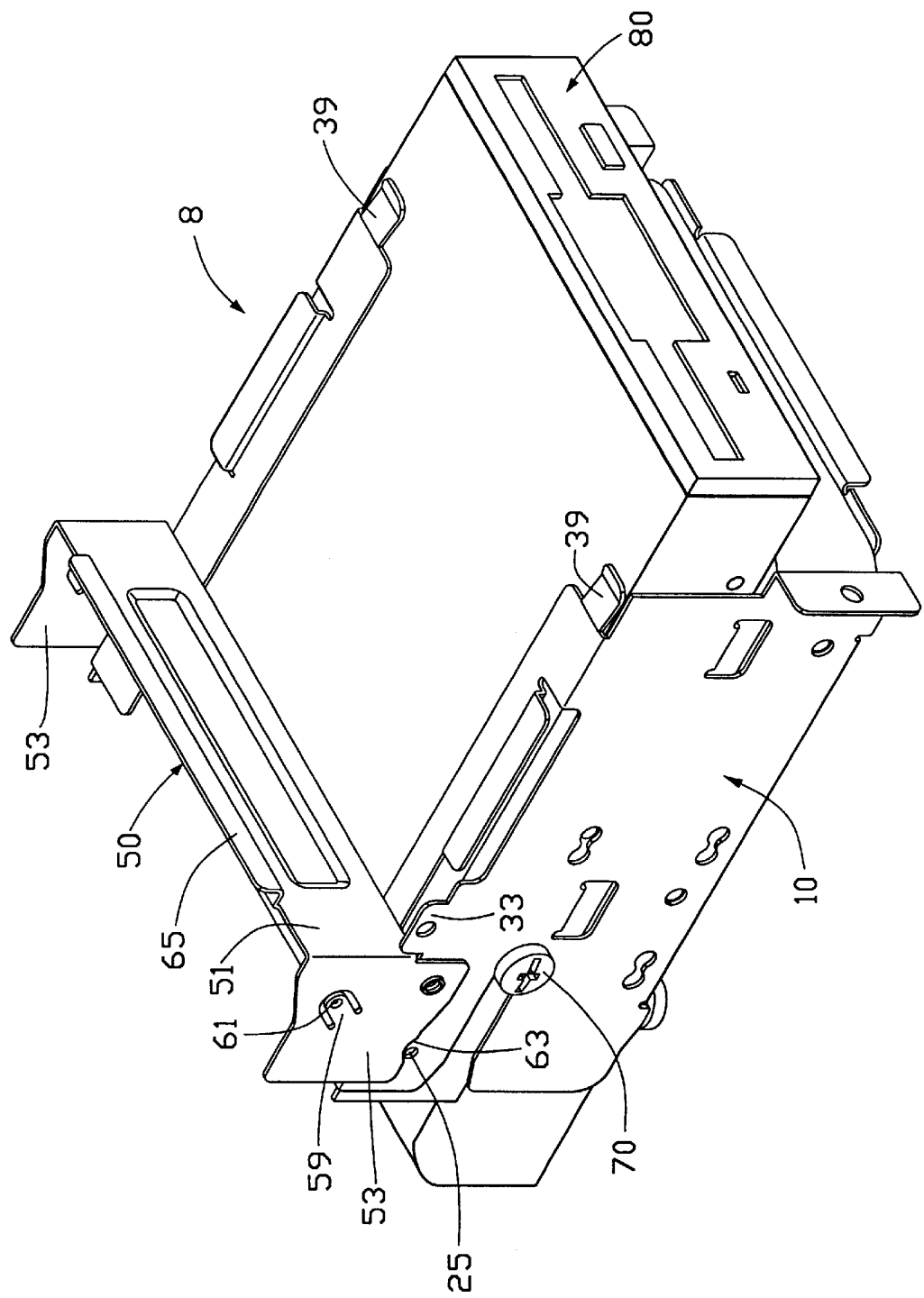
FIG. 2 is an assembled view of FIG. 1.

The lever 50 comprises a base 51 and a pair of side plates 53 extending from opposite ends of the base 51. The side plates 53 define pivot holes 57 for rotatably receiving pivoting portions 23 formed on the side walls 14, 16 of the body 10 thereby pivotally attaching the lever 50 to the body 10. The lever 50 is thus allowed to rotate between an open position (FIG. 2) and a closed position (FIG. 3). A positioning tab 59 which is stamped on each side plates 53 for being deflectable with respect thereto has a protruding boss 61 for being releasably and snugly received in a positioning hole 25 defined in the corresponding side wall 14, 16 of the body 10 to retain the lever 50 at the closed position. Each side plate 53 defines an arcuate cutout 63 corresponding to the sliding slot 18 for engaging with the bolt 70 of the FDD 80 received in the sliding slot 18 thereby effectively retaining the FDD 80 in the body 10. An actuating portion 65 is formed on the base 51 for actuating the lever 50 to pivot between the open position and the closed position.

Referring to FIG. 3, the computer enclosure 90 includes a cage 91 and a bridge 93 fixed in the cage 91. Two L-shaped fixing tabs 97 (only one tab being visible) extend from a bottom panel 95 of the bridge 93 facing each other. Perpendicular flanges 27, 29 extend from top edges of the side walls 14, 16 of the body 10 each forming an offset tab 31 for being slidably engaged with the L-shaped fixing tabs 97 thereby attaching the drive bracket 8 to the bridge 93. At least one side wall 99 of the bridge 93 has a fixing tab 103 partially overlapping a fixing tab 33 formed on the side wall 14 of the body 10. A hole 104 is defined in the fixing tab 103 corresponding to an inner-threaded hole 34 defined in the fixing tab 33 of the body 10 for receiving a bolt (not labeled) securing the drive bracket 8 to the bridge 93. The front panel 105 of the cage 91 defines a pair of apertures 107 corresponding to inner-threaded holes 37 defined in front flanges 35 of the body 10 for securing the drive bracket 8 to the cage 91. A lip 47 is formed on the front side of the bottom panel 12 for contacting the front panel 105 of the cage 91 and thus forming a grounding path therebetween.

Preferably, resilient fingers 39 are formed on the flanges 27, 29 for contacting and thus helping retain the FDD 80 in position.

Figure 4:
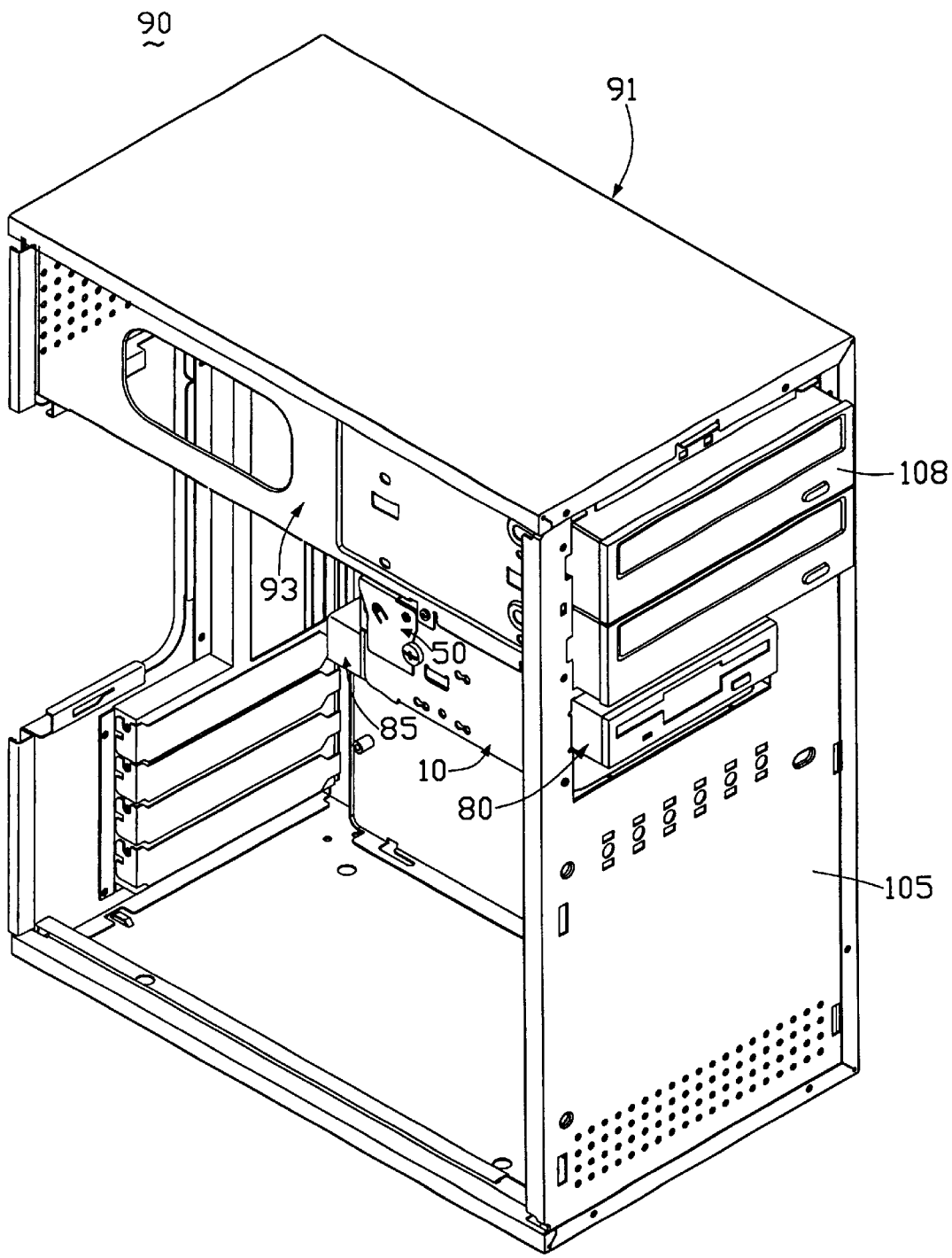
FIG. 4 is an assembled view of FIG. 3, with two CD-ROM drives attached thereto.

Also referring to, FIG. 4, the bridge 93 is attached to the cage 91 with two compact disc-read only memory (CD-ROM) drives 108 received therein. The drive bracket 8, modularized with the FDD 80 and the HDD 85, is attached under the bridge 93 with the offset tabs 31 of the body 10 engaging with the fixing tabs 97 of the bridge 93 and the fixing tab 33 of the body 10 being fixed to the fixing tab 103 of the bridge 93 by bolts (not labeled). The CD-ROM drives 108 are located above and close to the base 51 of the lever 50 whereby only a very limited rotation of the lever 50 is allowed after the drive bracket 8 is mounted in the computer enclosure 90, thus effectively preventing the lever 50 from being accidentally moved to the open position. Preferably, the actuating portion 65 is configured in an L-shape so that a physical contact may occur between the CD-ROM drive 108 and the actuating portion 65 for securely retaining the FDD 80 in the bracket 8.

Figure 5:
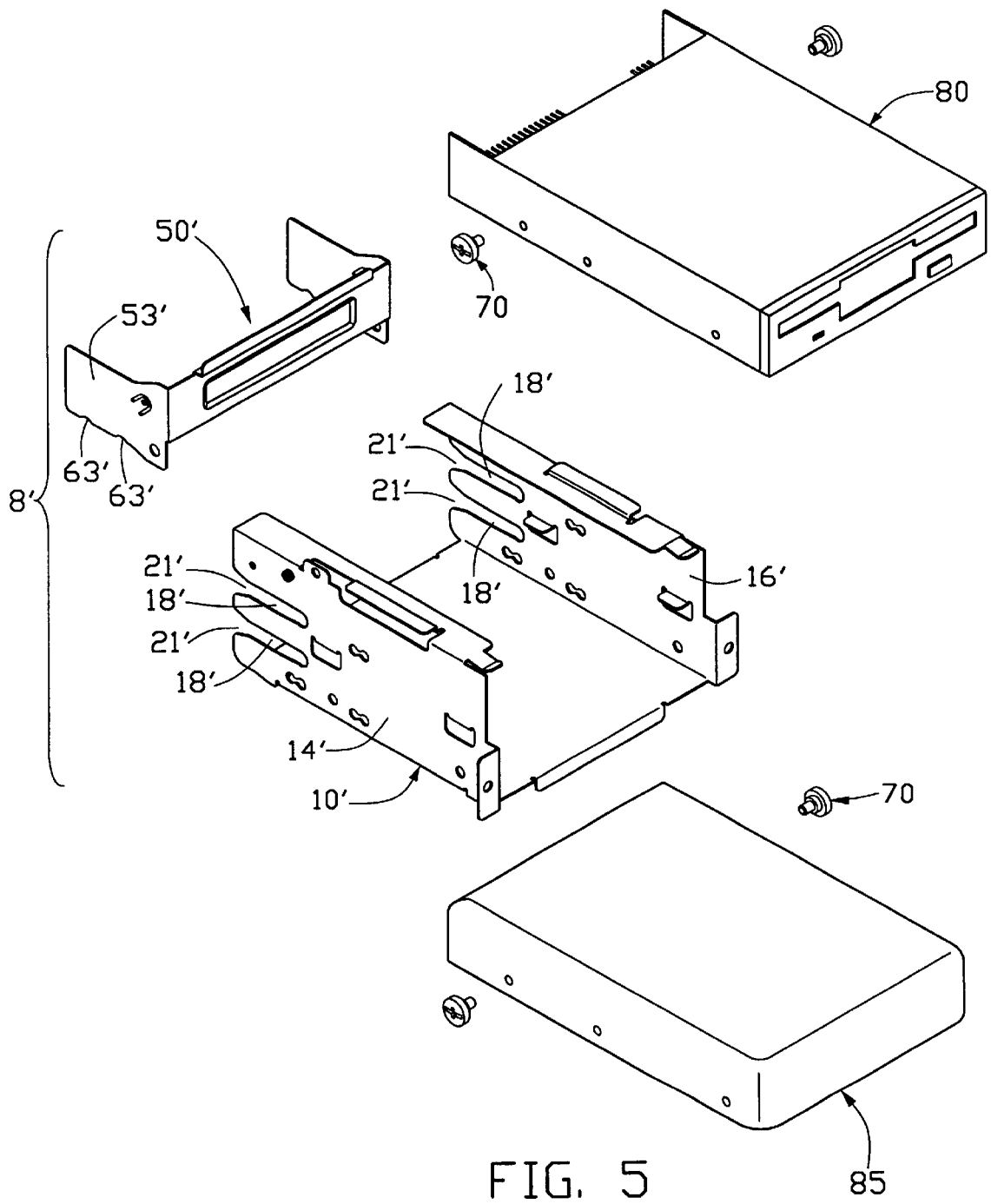
FIG. 5 is an exploded view of a drive bracket in accordance with a second embodiment of the present invention together with an HDD and an FDD for attachment thereto.
Figure 6:
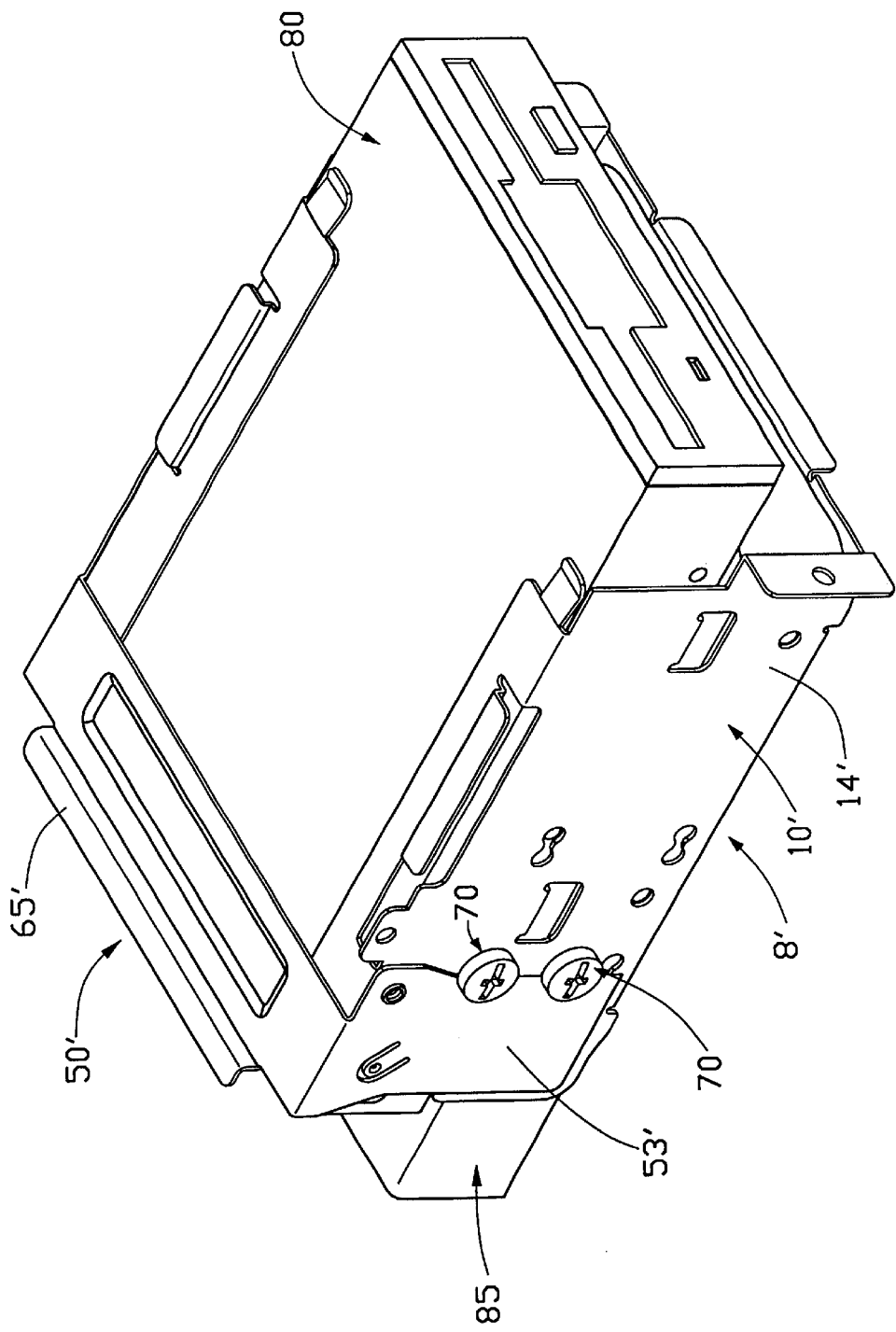
FIG. 6 is an assembled view of FIG. 5.

Referring to FIGS. 5 and 6, a drive bracket 8' in accordance with another embodiment of the present invention is shown, comprising a body 10' and a lever 50' pivotally attached to the body 10'. First and second side walls 14', 16' of the body 10' each form two pairs of sliding slots 18' having wide openings 21' for receiving bolts 70 fixed to opposite side walls of the FDD 80 or HDD 85. Each side plate 53' of the lever 50' forms a pair of arcuate cutouts 63' corresponding to the sliding slots 18' of the body 10' for engaging with the bolts 70 thereby retaining the FDD 80 and the HDD 85 in the bracket 8'.

Figure 7:
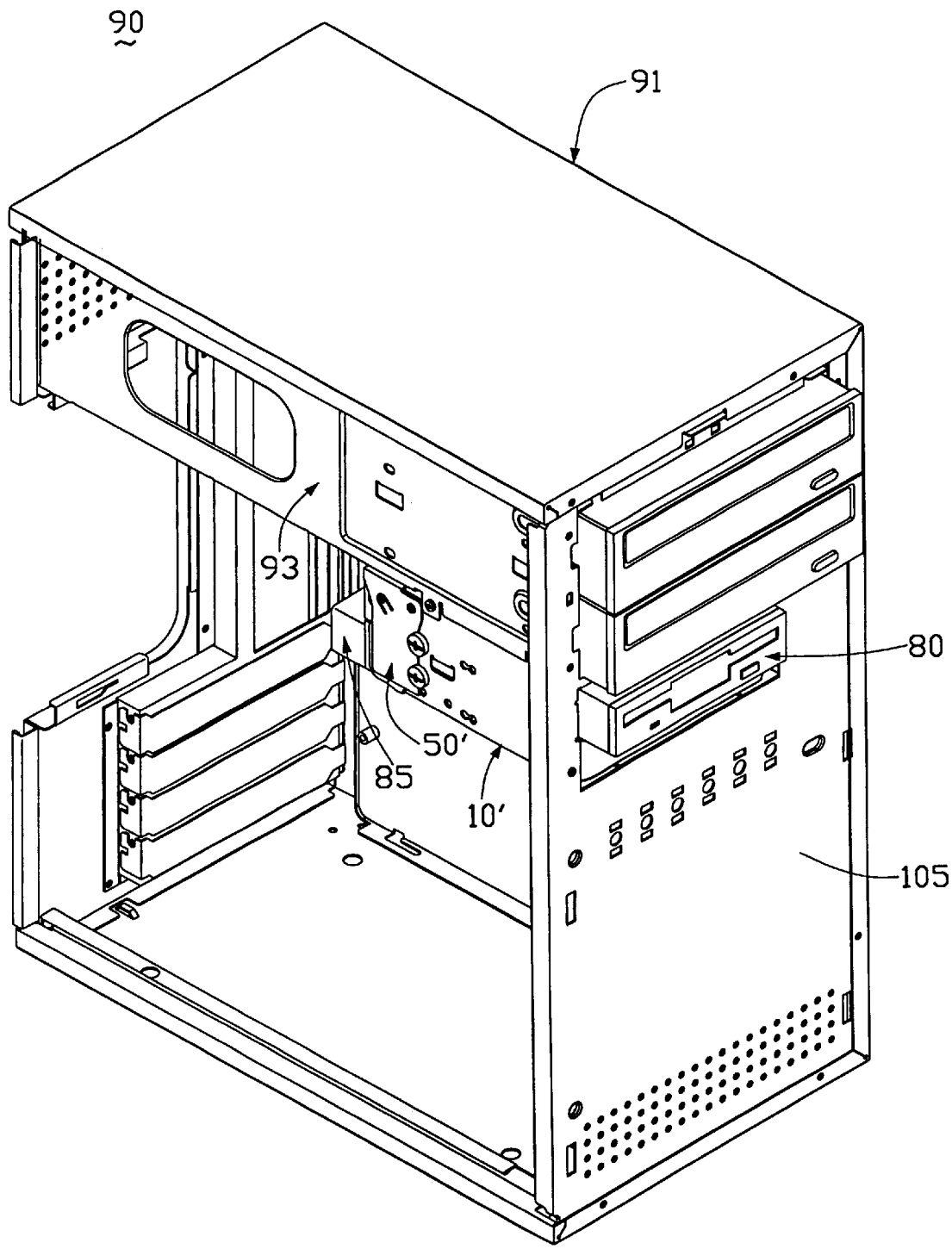
FIG. 7 is similar to FIG. 4 but showing the drive bracket of the second embodiment of the present invention attached to a computer enclosure.

Referring to FIG. 7, the drive bracket 8', modularized with the FDD 80 and the HDD 85, is fixed to the computer enclosure 90 by being attached under the bridge 93 and fixed to the front panel 105 as described previously with reference to FIG. 4.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A drive bracket comprising:
   a body comprising a bottom panel and two side walls extending from opposite edges of the bottom panel adapted to receive a data storage device therein, the body defining at least a pair of sliding slots for receiving bolts attached to the data storage device; and
   a lever comprising a base and two side plates extending from opposite ends of the base, the two side plates being pivotally attached to the side walls of the body for being pivotally movable to a closed position to engage with the bolts thereby retaining the data storage device in the body.

2. The drive bracket as described in claim 1, wherein each sliding slot has a wide opening for facilitating guiding the bolts of the data storage device into the sliding slots.

3. The drive bracket as described in claim 1, wherein each of the side walls has a pivoting portion rotatably received in a pivot hole defined in a corresponding side plate of the lever.

4. The drive bracket as described in claim 1, wherein each of the side walls of the body defines a positioning hole, each side plate of the lever forming a deflectable positioning tab having a protruding boss for being received in the positioning hole to retain the lever at the closed position.

5. The drive bracket as described in claim 1, wherein each side plate of the lever defines an arcuate cutout corresponding to the sliding slot of the body for engaging with the corresponding bolt of the data storage device.

6. The drive bracket as described in claim 1, wherein the lever has an actuating portion for moving the lever toward the closed position.

7. The drive bracket as described in claim 1, wherein the two side walls form resilient fingers for resiliently contacting the data storage device.

8. A drive bracket comprising:
   a body comprising a bottom panel and two side walls extending from opposite edges of the bottom panel adapted to receive at least two data storage devices therein, the slide walls defining at least two pairs of sliding slots for receiving bolts attached to each of the data storage devices; and
   a lever comprising a base and two side plates extending from opposite ends of the base, the side plates being pivotally attached to the side walls of the body for being pivotally movable to a closed position to engage with the bolts of the data storage devices.

9. The drive bracket as described in claim 8, wherein each sliding slot has a wide opening for facilitating guiding the bolts of the data storage devices into the sliding slots.

10. The drive bracket as described in claim 8, wherein each side plate of the lever defines at least two arcuate cutouts corresponding to the sliding slots of the body for engaging with the corresponding bolts of the data storage devices.

11. The drive bracket as described in claim 8, wherein each of the side walls has a pivoting portion rotatably received in a pivot hole defined in a corresponding side plate of the lever.

12. The drive bracket as described in claim 8, wherein each of the side walls of the body defines a positioning hole, each side plate of the lever forming a deflectable positioning tab having a protruding boss for being received in the positioning holes of the side wall to retain the lever at the closed position.

13. A computer enclosure comprising:

a cage;

a drive bracket adapted to receive at least one data storage device therein, the drive bracket being received and retained in the cage, the drive bracket comprising a body defining at least one pair of sliding slots for receiving bolts fixed to the data storage device, and a lever pivotally attached to the body for moving toward a closed position wherein the lever engages with the bolts of the data storage device thereby retaining the data storage device in the body.

14. The computer enclosure as described in claim 13, wherein a pair of side walls of the body each form a resilient finger for resiliently contacting the data storage device.

15. The computer enclosure as described in claim 13, wherein a pair of side walls of the body each form flanges each forming an offset tab for being received in a corresponding L-shaped fixing tab formed on a bridge mounted in the cage of the computer enclosure to retain the drive bracket to the cage.

16. The computer enclosure as described in claim 13, wherein a tab extends from one of two side walls of the body and defines a hole for extension of a bolt to fix the body to the cage.

17. The computer enclosure as described in claim 13, wherein a tab with a hole extends from a front edge of each of a pair of side walls of the body for receiving a bolt extending through a corresponding pair of holes defined in a front panel of the cage.

18. The computer enclosure as described in claim 13, wherein a lip extends from the drive bracket for contacting a front panel of the cage to ground the drive bracket.

19. A computer enclosure assembly comprising:

a cage receiving a first electronic device therein;

a drive bracket retainably positioned in the cage adjacent said first electronic device;

the drive bracket including a body and a lever rotatably attached to said body; and a second electronic device received within the body; wherein said lever is rotated to an open position to allow the second electronic device to be installed into the body first, and then rotated to a closed position to latchably engage said second electronic device, finally the first electronic device is installed into the cage under a condition that said lever is latchably engaged by said first electronic device, so that the second electronic device is locked in position in the bracket by the lever unless the first electronic device is removed from the cage to release the lever first.

20. The assembly as described in claim 19, wherein the first electronic device is installed into the cage in a first direction and the second electronic device is installed into the bracket in a second direction which is opposite to said first direction.

* * * * *